United States Patent [19]

Adams et al.

[11] Patent Number: 5,681,918
[45] Date of Patent: Oct. 28, 1997

[54] PROCESS FOR PREPARING COPOLYESTERS OF TEREPHTHALIC ACID ETHYLENE GLYCOL AND 1 4-CYCLOHEXANEDIMETHANOL EXHIBITING A NEUTRAL HUE HIGH CLARITY AND INCREASED BRIGHTNESS

[75] Inventors: Valerie Sue Adams, Gray; James Earl Hataway, Kingsport; Kenneth Alan Roberts, Gray, all of Tenn.

[73] Assignee: Eastman Chemical Company, Kingsport, Tenn.

[21] Appl. No.: 604,047

[22] Filed: Feb. 20, 1996

[51] Int. Cl.$^6$ .................................................. C08G 63/78
[52] U.S. Cl. .................... 528/279; 528/279; 528/280; 528/283; 528/285; 528/286; 528/296; 528/302; 528/307; 528/308.5; 528/308.6
[58] Field of Search ......................... 528/279, 280, 528/283, 285, 286, 296, 302, 307, 308.5, 308.6

[56] References Cited

U.S. PATENT DOCUMENTS

| | | | |
|---|---|---|---|
| 3,496,146 | 2/1970 | Adair, Jr. | 260/75 |
| 4,020,049 | 4/1977 | Rinehart | 528/274 |
| 4,501,878 | 2/1985 | Adams | 528/286 |
| 5,198,530 | 3/1993 | Kyber et al. | 528/279 |
| 5,340,907 | 8/1994 | Yau et al. | 528/274 |
| 5,385,773 | 1/1995 | Yau et al. | 428/221 |

FOREIGN PATENT DOCUMENTS

| | | |
|---|---|---|
| 04 2114757 A | 8/1992 | Japan . |
| WO 92 01013 | 1/1992 | WIPO . |
| WO 94 01482 A | 1/1994 | WIPO . |
| WO 94 25502 A | 11/1994 | WIPO . |
| WO 95 00575 A | 1/1995 | WIPO . |

OTHER PUBLICATIONS

Research Disclosure, No. 359, 1 Mar. 1994, pp. 142–144, XP000440539, "Improved Color Poly(Ethylene/1,4-Cyclohexylenedimethylene Terephthalate)", p. 241, Paragraph 1
Patent Abstracts of Japan, vol. 016, No. 556 (C–1007), 26 Nov. 1992.

*Primary Examiner*—Samuel A. Acquah
*Attorney, Agent, or Firm*—Andrew B. Griffis; Harry J. Gwinnell

[57] ABSTRACT

This invention relates to a three step process for preparing copolyesters exhibiting a neutral hue, high clarity and increased brightness. The process involves reacting terephthalic acid, ethylene glycol, and 1,4-cyclohexanedimethanol in a feed mole ratio of total glycols to dicarboxylic acid of 1.7:1 to 6.0:1, at a temperature of 240° C. to 280° C., and a pressure of 15 psig to 80 psig to form an esterification product; adding a polycondensation catalyst and a toner; and polycondensing the product at a temperature of 260° C. to 290° C. and a reduced pressure to form a high molecular weight copolyester.

1 Claim, No Drawings

PROCESS FOR PREPARING COPOLYESTERS OF TEREPHTHALIC ACID ETHYLENE GLYCOL AND 1 4-CYCLOHEXANEDIMETHANOL EXHIBITING A NEUTRAL HUE HIGH CLARITY AND INCREASED BRIGHTNESS

FIELD OF THE INVENTION

This invention relates to a three step process for preparing copolyesters of terephthalic acid, ethylene glycol, and 1,4-cyclohexanedimethanol that provides a product with a neutral hue, high clarity and increased brightness.

BACKGROUND OF THE INVENTION

Poly(1,4-cyclohexanedimethylene terephthalate) and, more specifically, copolyesters thereof containing 30 to 90 mole percent ethylene glycol are important commercial polyesters used in the production of plastic articles such as packaging materials, molded articles, and films. The manufacturing process historically utilized in the synthesis of these copolyesters involves an initial ester exchange reaction wherein dimethyl terephthalate, ethylene glycol, and 1,4-cyclohexanedimethanol are reacted in the presence of a suitable catalyst with removal of by-product methanol. The product of this reaction is polycondensed under reduced pressure and high temperatures to produce the final product.

One difficulty encountered in the manufacture of these copolyesters is attaining a product with a neutral hue instead of a slightly yellowish tint. For applications where these polymers are formed into thick sheet articles, the yellowish tint is particularly objectionable. A neutral hue with glass-like appearance is highly desirable. It is also desirable economically to produce these copolyesters using terephthalic acid instead of dimethyl terephthalate.

Attempts to prepare such copolyesters with terephthalic acid following prior art teachings regarding conditions for the esterification reaction, however, result in an esterification product with subsequent diminished activity in polycondensation. The diminished activity is observed when comparing the polycondensation reaction starting with an ester exchange product prepared using dimethyl terephthalate as a reactant instead of terephthalic acid.

U.S. Pat. No. 4,020,049 discloses a process for preparing linear polyesters from a dicarboxylic acid and glycols. Feed mole ratios of glycol to dicarboxylic acid of 1.05:1 to 1.7:1 are specified for the esterification reaction. U.S. Pat. No. 4,020,049 is not relevant to the process of the present invention because it teaches the use of lower feed mole ratios of glycol to dicarboxylic acid that result in reduced polycondensation activity with copolyesters of poly(1,4-cyclohexanedimethylene terephthalate) containing 30 to 90 mole percent ethylene glycol.

U.S. Pat. No. 5,198,530 discloses a process for preparing polyesters by esterification of terephthalic acid with 1,4-cyclohexanedimethanol. The process uses feed mole ratios of glycol to dicarboxylic acid of 1.0:1 to 1.5:1 in the esterification reaction, and requires a split feed of glycol into the esterification reactor along with a catalyst. In addition, U.S. Pat. No. 5,198,530 is only concerned with copolyesters having at least 80 mole % 1,4-cyclohexanedimethylene terephthalate units. U.S. Pat. No. 5,198,530 is not pertinent to the process of the present invention wherein high molecular weight copolyesters are produced using 30 to 90 mole % of ethylene glycol as a co-glycol along with higher feed mole ratios of glycol to dicarboxylic acid, and where no catalyst is required for esterification.

SUMMARY OF THE INVENTION

This invention relates to a process for preparing copolyesters of terephthalic acid, ethylene glycol, and 1,4-cyclohexanedimethanol which are characterized by a neutral hue, high clarity, and increased brightness. The process comprises the steps of:

(1) reacting terephthalic acid, ethylene glycol, and 1,4-cyclohexanedimethanol in a feed mole ratio of total glycols to dicarboxylic acid of 1.7:1 to 6.0:1, at a temperature of 240° C. to 280° C., and a pressure of 15 psig to 80 psig for 100 to 300 minutes to form an esterification product;

(2) adding a polycondensation catalyst and 0.1 to 40 ppm of a toner to the esterification product of Step (1), wherein the polycondensation catalyst is selected from the group consisting of titanium, germanium, antimony, and combinations thereof; and (3) polycondensing the product of Step (2) at a temperature of 260° C. to 290° C. and a reduced pressure of 400 mm Hg to 0.1 mm Hg for a sufficient time to form a copolyester having an inherent viscosity of at least 0.50 dL/g, said process comprising adding 10 to 100 ppm of a phosphorus stabilizer in Step (2) or in Step (3).

DESCRIPTION OF THE INVENTION

The process of the present invention is a three step process for preparing copolyesters of terephthalic acid, ethylene glycol, and 1,4-cyclohexanedimethanol having 30 to 90 mole percent ethylene glycol in the glycol component, based on 100 mole percent dicarboxylic acid and 100 mole percent glycol. Specifically, the invention provides for an improved process for conducting the esterification reaction that results in an esterification product with improved activity in the subsequent polycondensation reaction. The improved activity in the esterification product provides a means for subsequent reduction of catalyst concentrations, increases in stabilizer concentrations, and reductions in polycondensation temperatures that results in a high molecular weight copolyester product with a neutral hue, high clarity, and enhanced brightness.

In Step (1), terephthalic acid, ethylene glycol, and 1,4-cyclohexanedimethanol are reacted in a feed mole ratio of total glycols to dicarboxylic acid of 1.7:1 to 6.0:1 to form an esterification product. Preferably, the feed mole ratio is 2.0:1 to 4.5:1. The 1,4-cyclohexanedimethanol can be either a cis- or trans-isomer, or mixtures of the two isomers. The 1,4-cyclohexanedimethanol is added in an amount approximately equal to the mole percent desired in the final copolyester product, and the excess glycol in the reactant charge is ethylene glycol.

The dicarboxylic acid component containing terephthalic acid may optionally be modified with up to 10 mole percent of another dicarboxylic acid. Optional dicarboxylic acids include aromatic dicarboxylic acids preferably having 8 to 14 carbon atoms, aliphatic dicarboxylic acids preferably having 4 to 12 carbon atoms, and cycloaliphatic dicarboxylic acids preferably having 8 to 12 carbon atoms. Combinations of dicarboxylic acids may also be used. Specific examples of dicarboxylic acids other than terephthalic acid are isophthalic acid, naphthalenedicarboxylic acid, cyclohexanedicarboxylic acid, stilbenedicarboxylic acid, succinic acid, glutaric acid, adipic acid, and azelaic acid.

The glycol component containing ethylene glycol and 1,4-cyclohexanedimethanol may optionally be modified with up to 10 mole percent of an additional glycol. Such additional glycols include cycloaliphatic glycols preferably having 6 to 20 carbon atoms, aliphatic glycols preferably having 3 to 20 carbon atoms, and combinations thereof. Specific glycols other than ethylene glycol and 1,4-cyclohexanedimethanol are 1,2 propanediol, neopentyl glycol, 1,4-butanediol, 1,5-pentanediol, and 1,6-hexanediol.

The copolyesters of this invention may also contain small amounts of trifunctional or tetrafunctional comonomers such as trimellitic anhydride, trimethylolpropane, and pentaerythritol.

The esterification reaction in Step (1) is conducted at a temperature of 240° C. to 280° C. and a pressure of 15 psig to 80 psig. Preferably, the esterification reaction is conducted at a temperature of 240° C. to 260° C., more preferably 245° C. to 255° C. Preferably, the esterification reaction is conducted at a pressure of 20 psig to 50 psig. Reaction times for the esterification Step (1) vary from about 100 to 300 minutes, and are dependant upon the selected temperatures, pressures, and feed mole ratios of glycol to dicarboxylic acid. No catalysts are required for the esterification reaction.

The esterification reaction can be conducted batchwise, or in a series of continuous reactors. Reactants are preferably introduced to the esterification reactor as a slurry of terephthalic acid in the glycols, although separate addition of each reactant can also be used.

The esterification reaction, when conducted according to the reaction parameters specified, results in an esterification product with enhanced polycondensation activity. The use of feed mole ratios lower than those specified result in an esterification product with diminished activity in the subsequent polycondensation reaction. The enhanced polycondensation activity of the esterification product, when prepared with feed mole ratios in the range specified, permits the use of lower catalyst levels and milder temperatures in the subsequent polycondensation reaction.

In Step (2), a polycondensation catalyst and a toner are added to the esterification product of Step (1). The polycondensation catalyst is selected from titanium, germanium, and antimony. Combinations of polycondensation catalysts may also be used. Titanium is usually added in the form of an alkoxide. Examples of titanium compounds which may be used are acetyl triisopropyl titanate, tetraisopropyl titanate, and tetraisobutyl titanate. Germanium and antimony may be in the form of oxides, organic salts, and glycolates. The preferred polycondensation catalyst is titanium which is added in an amount of 10 to 60 ppm in the form of an alkoxide. Polycondensation catalyst concentration is related to the desired product color as well as the type and amount of stabilizers and toners used to retard or mask yellow color. For optimum color hue, clarity, and brightness, titanium is added in an amount of 12 to 25 ppm.

A phosphorus stabilizer is added in Step (2) or during the polycondensation reaction in Step (3). The phosphorus stabilizer is added in an amount of 10 to 100 ppm, preferably 40 ppm to 70 ppm. Preferred phosphorus stabilizers are phosphoric acid or alkyl esters thereof, diethyl acid phosphate, and trioctyl phosphate. More preferably, the phosphorus stabilizer is phosphoric acid.

A toner is added in an amount of 0.1 to 40 ppm in Step (2) to improve the neutral color characteristics of the copolyesters prepared by the present process. As used herein, the term "toner" includes organic pigments and inorganic pigments. The present inventors have determined that the use of greater than 40 ppm of a toner, however, imparts a gray color to the copolyester and reduces the clarity of the copolyester.

Using the esterification product prepared according to the process of this invention, along with low catalyst concentrations, lowered polycondensation temperatures, and higher phosphorus levels permits the production of a polyester product with less inherent yellowness. This permits the use of low levels of a toner to achieve the desired neutral hue, and results in a copolyester which exhibits high clarity and brightness when formed into molded articles and thick sheet.

A preferred inorganic toner is cobalt which may be added in the form of an organic acid salt such as cobalt acetate or cobalt propionate. Alternatively, thermally stable organic colored compounds having reactive groups that permit incorporation into the copolyester chain may be used as toners. Examples of suitable organic toner systems wherein thermally stable colored compounds having reactive sites are incorporated into a polyester to improve the hue of the polyester, such as certain blue and red substituted anthraquinones, are disclosed in U.S. Pat. Nos. 5,384,377; 5,372,864; 5,340,910; and 4,745,174 which are hereby incorporated by reference for their organic toner systems.

In Step (3), the product of Step (2) undergoes a polycondensation reaction for a sufficient time to form a copolyester having an inherent viscosity of at least 0.50 dL/g. The polycondensation reaction is conducted at a temperature of 260° C. to 290° C., preferably 270° C. to 280° C. The polycondensation reaction is conducted under reduced pressure of 400 mm Hg to 0.1 mm Hg, and the by product glycol is removed as evolved.

The molecular weight of the copolyester is indicated by a measure of the solution inherent viscosity (I.V.), which is measured at 25° C. by dissolving 250 mg of copolyester in 50 ml of a solvent consisting of a 60/40 weight ratio of phenol and tetrachloroethane. The copolyesters of this invention have an inherent viscosity of 0.5 to 0.9 dL/g, preferably 0.7 to 0.8 dL/g.

The following examples are intended to illustrate, but not limit, the scope of this invention. All parts and percentages in the examples are on a weight basis unless otherwise stated.

EXAMPLE 1

Esterification products were prepared using ethylene glycol (EG), terephthalic acid (TPA), and distilled cyclohexanedimethanol (CHDM) where the CHDM content of the copolyester was 31 mole percent of the total glycol content. The mole ratio of total glycols (EG+CHDM) to TPA was either 1.7:1 or 1.4:1 with the excess as EG. The esterification was carried out at 40 psig using a six mole laboratory batch reactor equipped with a water column to remove the generated water vapor. The reactor was heated and the temperature allowed to slowly increase to 240° C. where the esterification reaction began and the water vapor distilled off. Reaction completion was indicated by a decrease in water column temperature.

Two esterification products were prepared with a feed mole ratio of 1.7:1. One of the esterification products was prepared at a temperature of 240° C., and the esterification required 180 minutes to complete. At a higher average temperature of 255° C., the esterification reaction was complete in 100 minutes.

Two esterification products were prepared with a feed mole ratio of 1.4:1. At the lowest temperature of 240° C., the esterification required 240 minutes to complete. At a higher average temperature of 255° C., the esterification reaction was complete in 120 minutes.

After completion of the esterification reaction, the product was polymerized at 282° C. using 38 ppm titanium, 28 ppm cobalt, and 40 ppm phosphorus. The polycondensation reactors were equipped with an agitator, side-arm, nitrogen inlet, and heat source. Following melting at 225° C., the temperature was increased to 282° C. at 2°/min. The polycondensation reactions took place under a reduced pressure of <0.5 mm Hg with stirring speed at 50 rpm. The test results are summarized in Table I.

TABLE I

| | Batch Esterification | | Laboratory Polycondensation | |
|---|---|---|---|---|
| Feed Mole Ratio | Temperature °C. | Pressure psig | Time Minutes | IV |
| 1.7:1 | 240 | 40 | 55 | 0.782 |
| 1.7:1 | 255 | 40 | 55 | 0.741 |
| 1.4:1 | 240 | 40 | 95 | 0.742 |
| 1.4:1 | 255 | 40 | 95 | 0.765 |

The results in Table I clearly indicate the increased polycondensation activity in the esterification products prepared with the higher feed mole ratio. The esterification products made with a feed mole ratio of 1.7:1 achieved an I.V. of 0.72 dL/g to 0.78 dL/g within 50 to 55 minutes at 282° C. The esterification products made with a feed mole ratio of 1.4:1 required 90 to 95 minutes at 282° C. to achieve an I.V. of 0.72 to 0.78 dL/g.

EXAMPLE 2

Esterification products were prepared using ethylene glycol, terephthalic acid, and distilled cyclohexanedimethanol, where the cyclohexanedimethanol content of the copolyester was 31 mole % of the total glycol. The esterification reaction was carried out in two continuous reactors connected in series (R1 and R2). A third reactor was used as a flash tank for collection of the esterification product. The feed mole ratio of total glycols to terephthalic acid was varied from 2.0:1 to 1.3:1 with the excess as ethylene glycol. The esterification time was varied by adjusting the feed flow rate of the slurry into R1. The fixed volume reactors had approximately 2:1 volume ratio with 2230 ml in R1 and 1100 ml in R2.

The feed flow rate was varied from 10 to 19 ml/min. such that the total esterification time varied from 180 to 360 minutes. The temperature of the first esterification reactor (R1) was varied from 245° C. to 260° C., and the pressure was held at 37 psig. The temperature of the second esterification reactor (R2) was varied from 245° C. to 267° C., and the pressure was varied from 10 to 27 psig.

The esterification product was collected and polymerized in laboratory batch reactors in half-mole portions. The reactors were equipped with an agitator, side-arm, nitrogen inlet, and heat source. The catalyst system was 48 ppm titanium and 31 ppm phosphorus. After ten minutes at 225° C., the temperature was increased to 282° C. at 2°/min. The polycondensation reactions took place under a reduced pressure of <0.5 mm Hg with stirring speed at 50 rpm. Each esterification product was polymerized for 60 minutes. The test results are summarized in Table II.

TABLE II

| | Continuous Esterification | | | | | Laboratory Polycondensation | |
|---|---|---|---|---|---|---|---|
| Feed Mole Ratio | Temperature °C. | | Pressure psig | | Time Minutes | Time Minutes | IV |
| | R1 | R2 | R1 | R2 | | | |
| 2.0:1 | 245 | 250 | 37 | 27 | 180 | 60 | 0.756 |
| 2.0:1 | 260 | 270 | 37 | 27 | 180 | 60 | 0.738 |
| 2.0:1 | 245 | 250 | 37 | 27 | 320 | 60 | 0.731 |
| 1.8:1 | 245 | 250 | 37 | 27 | 180 | 60 | 0.738 |
| 1.8:1 | 245 | 250 | 37 | 10 | 180 | 60 | 0.700 |
| 1.3:1 | 245 | 250 | 37 | 10 | 180 | 100 | 0.232 |

The results in Table II clearly indicate the increased polycondensation activity in the esterification products prepared with the higher feed mole ratio, and the increased polycondensation activity with lower temperatures and shorter esterification times. The esterification product with the highest polycondensation activity, indicated by higher I.V., was produced using the highest feed mole ratio of 2.0:1, low esterification temperatures, and 180 minutes total esterification time. Increasing the esterification temperatures, while maintaining a feed mole ratio of 2.0:1, lowered the polycondensation activity of the esterification product. Increasing the esterification reaction time from 180 to 320 minutes, while maintaining a feed mole ratio of 2.0:1, also lowered the polycondensation activity. Lowering the feed mole to 1.8:1 decreased the polycondensation activity, and lowering the pressure in the second esterification reactor decreased the polycondensation activity further. Esterification products produced with a feed mole ratio of 1.3:1 were inactive in polycondensation with an I.V. of less than 0.7 achieved after 100 minutes polycondensation time.

EXAMPLE 3

Esterification products were prepared with different 1,4-cyclohexanedimethanol (CHDM) compositions using a slurry feed of ethylene glycol (EG), terephthalic acid (TPA), and 1,4-cyclohexanedimethanol (CHDM), where the CHDM content of the copolyester was either 12 molar percent or 62 molar percent of the total glycol content. The esterification reactions were carried out as described in Example 2. The feed mole ratio of total glycols (EG+ CHDM) to TPA was 2.0:1 with the excess as EG. The temperature of the first esterification reactor (R1) was 245° C., and the pressure was at 37 psig. The temperature of the second esterification reactor (R2) was 250° C., and the pressure was 27 psig. The polycondensation was carried out at 282° C. as described in Example 2 to a target IV of 0.70 to 0.80. The test results are summarized in Table III.

TABLE III

| | | Continuous Esterification | | | | | Laboratory Polycondensation | |
|---|---|---|---|---|---|---|---|---|
| Mole % CHDM | Feed Mole Ratio | Temperature °C. | | Pressure psig | | Time Minutes | Time Minutes | IV |
| | | R1 | R2 | R1 | R2 | | | |
| 12% | 2.0:1 | 245 | 250 | 37 | 27 | 180 | 65 | 0.721 |
| 62% | 2.0:1 | 245 | 250 | 37 | 27 | 180 | 30 | 0.792 |
| 62% | 1.8:1 | 245 | 250 | 37 | 27 | 180 | 30 | 0.648 |

Table III illustrates the polycondensation activity in esterification products prepared with different 1,4- cyclohexanedimethanol levels. Table III clearly indicates increased polycondensation activity in esterification products prepared with the higher feed mole ratio. The improved polycondensation activity with higher glycol to dicarboxylic acid mole ratio was demonstrated with the higher cyclohexanedimethanol esterification products, where an esterification product was prepared using a lower feed mole ratio is compared to the feed mole ratio of 2.0:1. The esterification product prepared with a feed mole ratio of 1.8:1 did not achieve target I.V. within 30 minutes, whereas the esterification product prepared with a feed mole ratio of 2.0:1 achieved an I.V. of 0.79 dL/g in 30 minutes.

EXAMPLE 4

Esterification products were prepared using ethylene glycol, terephthalic acid, and distilled cyclohexanedimethanol, where the cyclohexanedimethanol content of the copolyester was 31 molar percent of the total glycol content. The esterification reaction was carried out in two continuous reactors connected in series (R1 and R2). The feed mole ratio of total glycols to terephthalic acid was varied from 4.3:1 to 2.3:1 with the excess as ethylene glycol. The total esterification residence time was approximately 155 minutes. The temperature of the first esterification reactor (R1) was varied from 250° C. to 265° C., and the pressure was 45 psig. The temperature of the second esterification reactor (R2) was varied from 250° C. to 265° C., and the pressure was 27 psig.

Titanium and phosphorus solutions were added, along with organic toner dyes, into the first of two polycondensation reactors, also connected in series. The catalyst system utilized was 48 ppm titanium and 31 ppm phosphorus. The first polycondensation reactor (P1) was held at 265° C. at a pressure of 175 mm Hg. The approximate residence time in the P1 continuous reactor was 65 minutes. The final polycondensation reactor (P2) was of a horizontal design, with motor driven disk rings to enhance surface generation for the removal of ethylene glycol from the molten polymer as the polycondensation reaction progressed.

The approximate time in the final polycondensation reactor was 220 minutes, and the final polycondensation temperature was 272° C. The polycondensation reaction took place under a reduced pressure of approximately 1.0 mm Hg. Following polymerization, the molten polymer was extruded into a water bath to cool and harden, cut into pellets, and analyzed for inherent viscosity. The test results are summarized in Table IV.

TABLE IV

| | Continuous Esterification | | | | | Continuous | |
| --- | --- | --- | --- | --- | --- | --- | --- |
| | Temperature | | Pressure | | | Polycondensation | |
| Feed Mole | °C. | | psig | | Time | Time | |
| Ratio | R1 | R2 | R1 | R2 | Minutes | Minutes | IV |
| 4.3:1 | 250 | 250 | 45 | 27 | 155 | 220 | 0.767 |
| 4.3:1 | 255 | 265 | 45 | 27 | 155 | 220 | 0.748 |
| 2.3:1 | 255 | 265 | 45 | 27 | 155 | 220 | 0.685 |

The results in Table IV clearly indicate the increased polycondensation activity in the esterification products prepared with the higher feed mole ratio, and the increased polycondensation activity with lower esterification temperatures. The esterification product with the highest overall polycondensation activity was produced using the highest feed mole ratio of 4.3:1 and low esterification temperatures. Increasing the esterification temperatures, while maintaining a feed mole ratio of 4.3:1, lowered the polycondensation activity of the esterification product, indicated by the lower I.V. Lowering the feed mole ratio to 2.3:1 significantly lowered the polycondensation activity, and the target I.V. could not be achieved.

EXAMPLES 5

Esterification products were prepared using ethylene glycol, terephthalic acid, and distilled cyclohexanedimethanol, where the cyclohexanedimethanol content of the copolyester was 31 molar percent of the total glycol content. The esterification reaction was carried out in two continuous reactors connected in series as described in Example 2. The feed mole ratio of total glycols to terephthalic acid was 2.0:1 with the excess as ethylene glycol, and the total esterification time was 180 minutes. The temperature of the first esterification reactor (R1) was 245° C., and the pressure was 37 psig. The temperature of the second esterification reactor (R2) was 250° C., and the pressure was 27 psig.

The polycondensation catalyst and temperature were varied in this set of experiments to demonstrate the effect of polycondensation catalyst level and temperature on the rate of polycondensation and the rate of formation of yellow color in the final polymer. The b* color value is a measure of yellowness where a higher number is more yellow. Organic toner dyes were added to the esterification products, prior to melting and polycondensation. The phosphorus level was held constant at 25 ppm and the toner dye levels were held constant. The polycondensation reaction was carried out in laboratory batch reactors as described in Example 2. Following melting at 225° C., the temperature was increased to either 282° C. or 272° C. Each esterification product was polymerized to a target I.V. of 0.72 to 0.78 dL/g. The copolyester products were analyzed for inherent viscosity, catalyst levels, and Hunter Ultrascan b* values. The test results are summarized in Table V.

TABLE V

| Feed Mole Ratio | Continuous Esterification | | | | | Laboratory Polycondensation | | | | |
|---|---|---|---|---|---|---|---|---|---|---|
| | Temperature °C. | | Pressure psig | | Time | Temperature | Ti | Time | | |
| | R1 | R2 | R1 | R2 | Minutes | °C. | ppm | Minutes | IV | b* |
| 2.0:1 | 245 | 250 | 37 | 27 | 180 | 282 | 48 | 40 | 0.731 | 9.3 |
| 2.0:1 | 245 | 250 | 37 | 27 | 180 | 282 | 30 | 55 | 0.730 | 8.0 |
| 2.0:1 | 245 | 250 | 37 | 27 | 180 | 272 | 48 | 70 | 0.729 | 8.1 |
| 2.0:1 | 245 | 250 | 37 | 27 | 180 | 272 | 30 | 85 | 0.741 | 6.4 |
| 2.0:1 | 245 | 250 | 37 | 27 | 180 | 272 | 16 | 85 | 0.760 | 4.9 |

The results in Table V illustrate that esterification products made with a high feed mole ratio have sufficient polycondensation activity to achieve target I.V. with reduced catalyst levels and reduced polycondensation temperatures. The results clearly indicate reduced yellow color formation (lower b*) with reduced catalyst level and reduced polycondensation temperatures. Since the esterification products are the same, and the phosphorus level and organic toner dye levels are constant, the factors which affect the polycondensation rate and amount of yellow color developed in the polymer are the polycondensation catalyst level (Ti) and the polycondensation temperature.

When the polycondensation reaction is carried out to the target I.V. of 0.72 to 0.78 dL/g, the most yellow polymer is obtained using the highest temperature (282° C.) and the highest titanium level (48 ppm Ti). Significantly lower yellow values are obtained at the lower polycondensation temperature (272° C.) with the lowest b, value obtained with the lowest titanium level (16 ppm).

The polycondensation catalyst, temperature, and phosphorus level were varied in this set of experiments to demonstrate the effect of polycondensation catalyst level, temperature, and phosphorus level on the rate of polycondensation and the rate of formation of yellow color in the final polymer. The b, color value is a measure of yellowness where a higher number is more yellow. Organic toner dyes were added to the esterification products, prior to melting and polycondensation. The polycondensation reaction was carried out in laboratory batch reactors as described in Example 2. Following melting at 225° C., the temperature was increased to either 285° C. or to 275° C. Each esterification product was polymerized to a target IV of 0.72 to 0.78 dL/g. The copolyester products were analyzed for inherent viscosity, catalyst levels, and Hunter Ultrascan b* values. The test results are summarized in Table VI.

TABLE VI

| Feed Mole Ratio | Continuous Esterification | | | | | Laboratory Polycondensation | | | | |
|---|---|---|---|---|---|---|---|---|---|---|
| | Temperature °C. | | Pressure psig | | Time | Temperature | Ti | Time | | |
| | R1 | R2 | R1 | R2 | Minutes | °C. | ppm | Minutes | IV | b* |
| Polycondensation with 25 ppm P at 285° C. | | | | | | | | | | |
| 3.5:1 | 255 | 255 | 69 | 27 | 180 | 285 | 48 | 45 | 0.819 | 4.7 |
| 3.5:1 | 255 | 255 | 69 | 27 | 180 | 285 | 32 | 60 | 0.827 | 3.1 |
| Polycondensation with 45 ppm P at 275° C. | | | | | | | | | | |
| 3.5:1 | 255 | 255 | 69 | 27 | 180 | 275 | 32 | 130 | 0.755 | -.06 |
| 3.5:1 | 255 | 255 | 69 | 27 | 180 | 275 | 16 | 130 | 0.751 | -.23 |

EXAMPLE 6

Esterification products were prepared using ethylene glycol, terephthalic acid, and distilled cyclohexanedimethanol, where the cyclohexanedimethanol content of the copolyester was 31 molar percent of the total glycol content. The esterification reaction was carried out in two continuous reactors connected in series (R1 and R2). The feed mole ratio of total glycols to terephthalic acid was 3.5:1 with the excess as ethylene glycol. The total esterification residence time was held constant at approximately 185 minutes. The temperature of the first esterification reactor (R1) was 255° C., and the pressure was 69 psig. The temperature of the second esterification reactor (R2) was 255° C., and the pressure was 27 psig.

The results in Table VI illustrate that esterification products made with a high feed mole ratio have sufficient polycondensation activity to achieve target I.V. with reduced catalyst levels and reduced polycondensation temperatures. The results clearly indicate significantly reduced yellow color formation (lower b*) with reduced catalyst level, reduced polycondensation temperatures, and increased phosphorus level.

Since the esterification products are the same, and organic toner dye levels are constant, the factors which affect the polycondensation activity and amount of yellow color developed in the polymer are the polycondensation catalyst level (Ti), the polycondensation temperature, and the phosphorus level. The most yellow polymer was obtained using the high polycondensation temperature (285° C.), and the highest titanium level (48 ppm Ti) with 25 ppm phosphorus stabilizer. The color was improved somewhat by reducing the titanium level to 32 ppm. Significantly lower yellow values were obtained at the lower polycondensation temperature (275° C.) with higher levels of phosphorus stabilizer (45 ppm P). Although much longer polycondensation time was required, the target I.V. of 0.72 to 0.78 dL/g was obtained, and the lowest b* value was obtained with the lowest titanium level (16 ppm).

Many variations will suggest themselves to those skilled in this art in light of the above detailed description. All such obvious modifications are within the full intended scope of the appended claims.

What is claimed is:

1. A process for preparing a copolyester consisting essentially of terephthalic acid and a glycol component comprising ethylene glycol and 1,4-cyclohexanedimethanol, consisting essentially of:

reacting ethylene glycol, 1,4-cyclohexanedimethanol, and terephthalic acid in the mole ratio of 1.7 to 6.0 moles of the glycol component to 1.0 mole of terephthalic acid to make an esterification product; and reacting said esterification product in the presence of additional elements consisting of titanium and at least one element selected from cobalt and phosphorus, to make the copolyester, said copolyester having an inherent viscosity of at least 0.50 dL/g.

* * * * *